United States Patent Office — 3,842,020 — Patented Oct. 15, 1974

3,842,020
METHOD OF EXPANDING A RESOLE RESIN CONTAINING EXPANDABLE THERMOPLASTIC MICROSPHERES AND PRODUCT OBTAINED THEREFROM

Walter L. Garrett, Freeland, Mich., assignor to The Dow Chemical Company, Midland, Mich.
No Drawing. Continuation-in-part of abandoned application Ser. No. 196,746, Nov. 8, 1971. This application June 18, 1973, Ser. No. 371,083
Int. Cl. C08g *53/10;* B01j *13/02*
U.S. Cl. 260—2.5 B                          20 Claims

ABSTRACT OF THE DISCLOSURE

Phenolic resole foams of generally uniform small cell size and excellent mold replication characteristics are obtained by incorporating expandable thermoplastic microspheres in an acid-catalyzed resole foaming composition.

---

This application is a continuation-in-part of my copending application Ser. No. 196,746, filed Nov. 8, 1971, now abandoned.

Synthetic resins have been widely used for various applications including structural elements and thermal insulation. Beneficially such synthetic resins for such purposes are oftentimes employed as a foam and desirably as a closed cell foam. Such foams arbitrarily may be divided into two classes: insulating foams and structural foams. Insulating foams often are considered to have densities of from about 2 to about 20 pounds per cubic foot and structural foams densities of from about 20 to 50 pounds per cubic foot. Beneficially, thermal insulation foams find application as thermal insulation for pipes, vessels, enclosures and the like, whereas structural foams find application in furniture, tools, trim and other decorative and utilitarian items. Thermoplastic foams have a substantial disadvantage in their solvent sensitivity and softening under the application of heat; many are inflammable, while some which are non-inflammable on being subjected to open flame evolve copious quantities of noxious fumes frequently containing substantial quantities of halogens such as chlorine and bromine. Phenolic resins are thermosetting in nature in that they do not creep or cold flow as do thermoplastic resins. However, much difficulty has been encountered in obtaining thermoplastic foams having desirable characteristics for insulating foam or structural foam applications. Generally, phenolic foam compositions tend to be brittle, particularly in the lower densities such as are desirable for insulation, and in the higher densities when phenolic foam forming compositions are being molded they give relatively poor replication; that is, poor reproduction of mold detail and have relatively large open cells.

It would be desirable if there were available an improved method for the preparation of foams from phenolic resins.

It would also be desirable if there were available an improved method for the preparation of small, closed cell phenolic resin foams.

It would further be desirable if there were available an improved method for the preparation of such phenolic foams having increased resistance to heat and suitable for insulation and structural applications.

It would also be desirable if there were available an improved method for the preparation of structural foams from phenolic resins.

It would also be desirable if there were available an improved method for the preparation of small closed cell phenolic resin foams having densities from about 2 to 20 pounds per cubic foot and suitable for thermal insulation.

It would further be desirable if there were available an improved method for the preparation of such phenolic structural foams.

These benefits and other advantages in accordance with the present invention are achieved in a method for the preparation of thermoset synthetic resinous resole foam compositions, the steps of the method comprising providing in intimate admixture (a) a resole resin having a viscosity of from 300 to 100,000 centipoises at 25° C. when the water content of the resin is 15 percent by weight, (b) a catalyst for the resole resin, the catalyst comprising a strong inorganic or organic acid, (c) a plurality of synthetic resinous thermoplastic expandable microspheres, the microspheres comprising a synthetic resinous thermoplastic shell of a polymer containing at least 50 percent by weight vinylidene chloride and at least one ethylenically unsaturated monomer copolymerizable therewith, having encapsulated therein a volatile liquid foaming agent, and confining the mixture within a mold of desired configuration and curing the mixture until the mixture has hardened to a self-supporting mass containing a plurality of closed, gas-filled cells having diameters from 10 to 100 microns.

Also contemplated within the scope of the present invention is an improved resole foam, the resole foam comprising a body of a continuous cured resole resin containing a plurality of expanded thermoplastic synthetic resinous gas-filled microspheres having a polymer shell containing at least 50 weight percent vinylidene chloride, the resole foam having a density of from about 10 to 50 pounds per cubic foot.

Phenolic resins suitable for practice of the present invention are alkaline-catalyzed phenol aldehyde concentration products commonly called one-step resins or "resoles," often referred to as "A" stage of resinification, the "C" stage being the fully cured thermoset resin stage. The soles are generally liquid and water soluble; they usually contain or consist of from about 3 to 25 percent by weight of water and have viscosities of from about 200,000 to 200 centipoises, respectively, at 25° C. Minor amounts of water can be tolerated in the resole resins, although it is preferred that the water content be kept to less than 20 percent by weight of the resole. Advantages are obtained by employing mixtures of two or more of the resole resins, for examples, in order to control the initial viscosity. Resolve resins or mixtures having a viscosity of from about 300 to 100,000 centipoises at 25° C. when the water content is adjusted to 15 percent by weight water, based on the total weight of water and resin, are preferred.

The resole resins employed in this invention are the reaction products of a phenol and an aldehyde. Usually from about 1.1 to 3 moles of the aldehyde per mole of the phenol (preferably from 1.5 to 2.5 moles of the aldehyde per mole of the phenol) are employed in producing suitable resole resins. Typical of the phenols that are useful in producing suitable resole resins are those represented by the formula

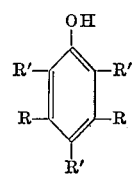

wherein at least two groups represented by R' are hydrogen atoms and the groups represented by R and any remaining group represented by R' are hydrogen atoms or groups which do not impede the condensation of the phenol with an aldehyde (e.g., a substituent such as halogen atom or a hydroxy, alkyl or aryl group). Illustrative of suitable phenols are phenol, cresols (particularly m-cresol), xylenols (particularly 3,5-xylenol) and dihydroxybenzenes (particularly resorcinol). Typical of the aldehydes that can be useful in producing suitable resole resins are formaldehyde (including the oligomers and polymers of formaldehyde such as trioxane), furfural, sugars and cellulose hydrolyzates. Such aldehydes can be employed without dilution or dissolved in suitable solvents including aqueous alcohols (e.g., aqueous methanol, n-propanol, isobutanol or n-butanol). The reaction of the phenol and the aldehyde is conducted in the presence of a basic catalyst such as ammonia, sodium hydroxide, potassium hydroxide or barium hydroxide in an amount of from 0.1 to 0.001 mole of catalyst (or preferably from 0.05 to 0.002 moles of catalyst) per mole of the phenol. The resole resin is generally a liquid.

The resole resins used in this invention are usually not highly polymerized so that they are normally liquid and generally water-soluble. This is often referred to as the "A" stage of resinification as distinguished from the "C" stage which is fully cured thermoset resin stage. As the condensation between the phenol and aldehyde progresses from the liquid low molecular weight resins, the molecular weight of the condensation product increases and the resin exhibits a corresponding increase in viscosity. Advantages are also made of mixtures of several different resole resins in order to control the initial viscosity and reactivity of the foamable compositions. For example, mixtures of a high viscosity and a low viscosity resin have been used to control the ultimate density of the foam. Similarly, a mixture of a liquid and a solid resole can be employed to the same effect. Any resole resin either initially liquid or made fluid by the addition of any agent or by any techniques may be employed in the present invention.

The acids employed as catalysts are the strong inorganic acids such as sulfuric acid, hydrochloric acid, phosphoric acid, nitric acid; i.e., the strong mineral acids, or aqueous solutions of said acids; e.g., a concentrated aueous solution of hydrochloric acid, or strong organic acids such as benzene sulfonic acid, toluene sulfonic acid, phenol sulfonic acid, xylene sulfonic acid, β-naphthalene sulfonic acid and α-naphthalene sulfonic acid. Mixtures of any two or more of the acids can also be used.

Oftentimes in order to hasten mixing a surfactant or surface active agent is employed, and beneficially a non-ionic surfactant such as the reaction or condensation product of an alkylene oxide having from 2 to 4 carbon atoms in the molecule with a compound such as higher alkyl-phenols having from 8 to 12 carbon atoms in the alkyl group, fatty acids having from 12 to 22 carbon atoms, and alkyl silanes and silicones. Among suitable surfactants are (a) the polyoxyethylene ethers of alkyl phenols having the general formula

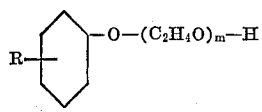

wherein R is an alkyl group having from 8 to 12 carbon atoms and $m$ is an integer from about 8 to 20, (b) ethoxylated castor oil and ethoxylated hydrogenated castor oil; i.e., the condensation product of said castor oils and from 8 to 20 moles of ethylene oxide per mole of said castor oil, (c) copolymers of ethylene oxide and propylene oxide containing from 8 to 20 moieties of each of said alkylene oxides, and alkyl silane polyoxyalkylene block copolymers similar to those described in U.S. Pat. 2,834,748.

Beneficially, the surfactant is the condensation product of ethylene oxide and nonyl phenol having a molecular weight of about 880, or an alkyl silane alkylene oxide block copolymer of the formula

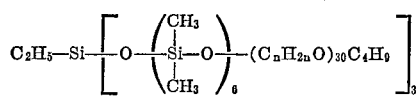

wherein $C_nH_{2n}O$ is a mixed oxyethylene/oxypropylene block of about 17 oxyethylene units and about 13 oxypropylene units.

If desired, suitable fillers are employed with benefit. The fillers may contribute bulking or reinforcement. Suitable fillers are those which are non-reactive or substantially non-reactive with the catalyst or resole resin under conditions of polymerization. Fillers are readily evaluated by prepared resin catalyst mixtures in the absence of the microspheres. If the mixture cures, the filler is suitable; if no curing or poor curing is obtained, the filler is unsuitable. Useable fillers include wood flour, carbon black, glass fibers, polyester fibers, polyacrylonitrile fibers, hollow phenolic microspheres, carbon microspheres, fibrous slag, expanded perlite such as is disclosed in U.S. Pats. 2,421,902; 2,521,190; 2,639,132; hollow inorganic microspheres such as are disclosed in U.S. 2,797,201; foamed clay micropheres such as are set forth in U.S. 2,676,892. The teachings of the foregoing patents are herewith incorporated by reference thereto. Clays, including bentonite, kaolin, attapulgus, expanded vermiculite and non-expanded vermiculite, ceramic foam particles, slags in open hearth and blast furnaces, sand, and non-cellular inorganic material are also employed with benefit.

Synthetic resinous thermoplastic micropheres useful in the practice of the present invention contain at least 50 weight percent vinylidene chloride polymerized in their polymer shell and are well known in the art and the preparation thereof is described in U.S. Pat. 3,615,972, the teachings of which are herewith incorporated by reference thereto. The expandable microspheres which are useful in the present invention are those expandable microspheres which are generally insoluble in the resole resin and contain at least 50 weight percent vinylidene chloride polymerized in the polymer shell, the remainder being one or more ethylenically unsaturated monomers copolymerizable therewith. A rapid method for determining the suitability of any expandable microsphere in the resole resin composition is readily determined by admixing 2 parts by weight of thermoplastic expandable microspheres with 98 parts by weight of a resole resin, and in the absence of a curing catalyst for the resole resin, heating the resin/microsphere mixture to a temperature sufficient to cause foaming and observing the behavior of the microspheres through an optical microscope. If the microspheres dissolve and lose their distinct spherical identity prior to foaming or expanding, they may be unsatisfactory for the particular resole resin.

An alternate procedure for determining suitability of microspheres without the aid of a microscope is to mix 2 parts by weight of the thermoplastic microspheres with 98 percent of the resole resin, heat the mixture with adequate stirring to maintain a generally uniform temperature until the microspheres expand. This point is readily observed, as the mixture has a marked apparent increase in volume. The temperature of the mixture at the volume increase is taken as the temperature of expansion. The cure time of a resole at the temperature of expansion employing a desired acid catalyst is determined by mixing resole and catalyst, then heating the mixture to the temperature of expansion and periodically dropping a one inch steel ball bearing from a height of about one inch into the mixture. The time when the ball bearing does not penetrate the surface is taken as the cure time. A third mixture of the resole and microspheres is prepared employing 2 weight percent microspheres and is heated to the expansion temperature for the cure time. If the microspheres remain intact, the combination of resole and microspheres is eminently satisfactory for the practice of the present invention. The survival of the microspheres can be determined either microscopically or by observing the volume of the resole mixture. Any large decrease in volume or obvious gassing indicates destruction of the microspheres. If the microspheres retain their identity for a sufficient length of time to expand, they are satisfactory for use with that particular resole resin or one having less solvent power. In general, the solvent power or tendency of the resole to dissolve the microspheres increases with temperatures and decreases with increasing molecular weight of the resole; such solubility is time and temperature dependent. Soluble microspheres as determined by the foregoing test can satisfactorily be made to perform in the practice of the present invention by raising the molecular weight of the resole resin, or alternately, initiating polymerization prior to admixing the resin and microspheres. Addition of water or similar diluent such as ethyl alcohol to the resole resin also reduces the apparent solvent action of the resin on the microspheres. In general, thermoplastic expandable microspheres which are found eminently satisfactory for use with all resole resins are those prepared from polymers which are known to be relatively insoluble. Most conveniently, polymers containing major portions of vinylidene chloride and the remainder being one or more ethylenically unsaturated monomers copolymerizable therewith, are satisfactory. The composition of the expandable microsphere is not critical. If the microspheres pass the hereinbefore delineated solubility tests, a satisfactory resole resin foam is obtained. Particularly desirable microspheres for use with resole resins are those having external shells of the following compositions wherein the units are percent by weight:

70 vinylidene chloride, 25 acrylonitrile, 5 methacrylonitrile
75 vinylidene chloride, 25 acrylonitrile
90/10 vinylidene chloride, 10/90 acrylonitrile
70 vinylidene chloride, 5 vinyl chloride, 25 acrylonitrile
75 vinylidene chloride, 24 acrylonitrile, 1 acrylic acid
75 vinylidene chloride, 24 acrylonitrile, 1 methacrylic acid
80 vinylidene chloride, 15 acrylonitrile, 5 methylmethacrylate
75 vinylidene chloride, 5 vinyl chloride, 5 vinyl acetate, 15 acrylonitrile.

Generally, blowing agents such as n-pentane, isopentane, butane, isobutane are eminently satisfactory.

Accordingly, the amount of acid catalyst can vary widely, depending upon the quantity of acid used to initiate the reaction of the resole. In general, the amount of acid can range from 0.5 to 30 parts per 100 parts of of the resole resin, the amount depending upon the strength of the acid. For example, good results are obtained with from 1 to 5 parts of 37 percent hydrochloric acid, or 50 percent sulfuric acid, phosphoric acid or nitric acid. Also, good results are obtained with 3 to 10 parts of benzene sulfonic acid, toluene sulfonic acid, xylene sulfonic acid, or naphthalene sulfonic acid.

The resole resins as previously mentioned beneficially can have a viscosity between 200 and 200,000 centipoises at 25° C. However, the resole resins are advantageously employed or blended with the catalyst and microspheres at temperatures such that resin viscosities not exceeding about 20,000 centipoises, preferably from about 500 to 15,000 centipoises, are obtained. The resole resins of high viscosity are preferably heated to a temperature below the expansion temperature of the microspheres so as to reduce the viscosity to the preferred range and is thereafter mixed or blended with the catalyst and microspheres or vice versa and allowed to foam.

Foams in accordance with the present invention are readily prepared by admixing the components simultaneously; that is, the resole resin, the expandable microspheres, the catalyst and optionally the filler. Advantageously, the microspheres may be employed either dry, as a wet filter cake or as a water slurry. Generally in order to maintain desired viscosity characteristics and minimize vapor pockets due to steam, the microspheres are added dry or as a wet filter cake containing up to 50 percent by weight of water. Generally it is desirable to incorporate within the curable resole mixture from about 1 to about 50 percent of the expandable microspheres, and beneficially from 3 to 10 weight. When filler is employed, it is usually beneficial to employ from about 5 parts to about 50 parts, and beneficially from about 10 parts to about 30 parts by weight of the inorganic filler which beneficially is a cellular inorganic filler such as expanded perlite. The parts being parts by weight per hundred parts by weight of the resole resin. The ultimate density of the cured microsphere-containing resole foam will depend in part upon the concentration of the microspheres, the reaction temperature reached during the cure of the foamable composition, mechanical restraint imposed upon the resin during the cure, the volume of foamable composition placed within the mold relative to the volume of the mold. For lower densities, larger proportions of microspheres are employed; whereas for higher densities, smaller proportions are employed.

Foams prepared in accordance with the present invention have an exceptionally small cell size primarily due to the expandable microspheres retaining their integrity. The foams are tough or impact resistant in sharp contrast to the brittle nature of resole resin foams prepared without expandable microspheres. Addition of microspheres in accordance with the persent invention provides excellent fastener holding ability for screws, nails and the like in resole foams as well as providing a remarkable wood-like character to the foam. The foams of the present invention are readily sawn, whittled, worked with a wide variety of wood working tools and the foams accept conventional wood finishes, in many cases with greater ease and efficiency than many woods. The foams of the present invention are readily molded to a variety of shapes and show excellent reproduction of mold detail including wood grain. Further, the foams of the present invention are quite fire resistant. Beneficially, foams prepared in accordance with the present invention have densities of from about 10 pounds per cubic foot to about 50 pounds per cubic foot. Where such foams are employed for high strength thermal insulation, such as for pipe covering, gaskets, automotive insulation and the like, a density range of about 10 to 20 pounds per cubic foot is preferred. However, for structural purposes such as for wood replacement, furniture parts, structural purposes such as for wood replacement, furniture parts structural elements, containers and the like, densities of from about 20 to 50 pounds per cubic foot are desirable.

The invention is further illustrated but not limited by the following examples.

EXAMPLE 1

A phenol/formaldehyde resole resin is prepared in the following manner:

(A) A charge of 188 grams (2 moles) of phenol, 243 grams of aqueous 37 weight percent (3 moles) of formaldehyde solution and 1.88 grams of flake sodium hydroxide as catalyst, is placed in a glass reaction vessel equipped with a reflux condenser and stirrer. The mixture is stirred and heated at 65° C. for 6 hours, then neutralized to a pH of about 7.0 with oxalic acid. The neutralized mixture is stirred and heated under reduced pressure; i.e., subatmospheric pressure, while removing volatile ingredients including water to leave a residue or product consisting of about 80 percent by weight resole resin and about 20 percent water. The product has a viscosity of 6000 centipoises at 25° C.

(B) Expandable synthetic resinous microspheres are employed. The microspheres have an external polymer shell of 75 weight percent vinylidene chloride and 25 weight percent acrylonitrile and contain symmetrically encapsulated therein as a distinct and separate phase about 20 weight percent isobutane.

(C) A catalyst mixture is prepared which is a 1:1 by volume mixture of concentrated hydrochloric acid and ethylene glycol. A foamable hardenable composition is prepared by rapidly admixing 450 parts by weight of the hereinbefore described phenol/formaldehyde resin; 45 parts by weight of the expandable microspheres; 21 parts by weight of catalyst and 5.4 parts by weight of the hereinbefore described alkyl silane alkylene oxide block copolymer commercially available under the trade designation of DC 193. The components are hand mixed by hand stirring in the sequence of resole resin, silane copolymer, microspheres and catalyst. After gentle hand mixing the ingredients are blended for about 30 seconds with a high speed propeller-type mechanical agitator. The foam mixture is immediately transferred to the mold, the mold closed and placed in an air oven having a temperature of 70° C. and permitted to cure for a period of one hour. On removal of the mold and the foam therefrom, the resultant foam has a density of 42.6 pounds per cubic foot; microscopic examination of a section of the foam indicates that the cells are spherical and 100 percent closed having diameters ranging from about 40 to 50 microns. Mechanical evaluation of the foam indicates a compressive strength of 2825 pounds per square inch and a compressive modulus of 46,300 pounds per square inch. The resultant foam has a texture and general physical appearance very similar to wood, but without the directional characteristics imparted by the elongate cells of wood.

EXAMPLE 2

The procedure of Example 1 is repeated with the exceptions that the quantity of the phenol/formaldehyde resole and microspheres are altered. The results are set forth in Table I. The physical properties of the foams are set forth in Table II.

TABLE I.—FOAM FORMULATIONS

| Sample number | Resole [1] | Expandable microspheres [1] | DC 193 [1] | Catalyst ccs.[2] | Weight percent microspheres [3] |
| --- | --- | --- | --- | --- | --- |
| 1 | 40 | 27 | 0.48 | 1.6 | 67.5 |
| 2 | 90 | 60 | 1.08 | 3.6 | 66.5 |
| 3 | 180 | 36 | 2.16 | 5.6 | 20 |
| 4 | 180 | 30 | 2.16 | 8.4 | 16.7 |
| 5 | 240 | 30 | 2.88 | 11.2 | 12.5 |
| 6 | 360 | 30 | 4.3 | 16.8 | 8.35 |
| 7 | 450 | 30 | 5.4 | 21.0 | 6.7 |

[1] Grams.
[2] HCl catalyst described in Example 1.
[3] Based on resole.

TABLE II.—PHYSICAL PROPERTIES OF THE FOAMS LISTED IN TABLE I

| Sample number | Density [1] | Compressive | | Flexural | | Hardness, lbs.[3] | Percent open cells |
| --- | --- | --- | --- | --- | --- | --- | --- |
| | | Strength [2] | Modulus [2] | Strength [2] | Modulus [2] | | |
| 1 | 4.5 | 46 | 1,600 | | | | 30.8 |
| 2 | 10.1 | 180 | 6,825 | | | | 0 |
| 3 | 12.4 | 250 | 18,430 | | | | 0 |
| 4 | 16.9 | 440 | 14,500 | 486 | 28,700 | 39 | 0 |
| 5 | 22.8 | 845 | 24,250 | 715 | 39,300 | 57 | 0 |
| 6 | 35.3 | 1,730 | 37,500 | 1,190 | 73,500 | 154 | 0 |
| 7 | 41.3 | 2,715 | 45,500 | 1,900 | 100,000 | 259 | 0 |

[1] Pounds per cubic foot.
[2] Pounds per square inch.
[3] 10% ball penetration.

Sample 1 has 30 percent open cells and the remainder closed spherical cells. Samples 2–7 have cells which are completely closed, spherical and about 40 to 50 microns in diameter. Each sample has an outer surface which shows excellent reproduction of the mold surface in detail.

EXAMPLE 3

For comparative purposes, two phenol/formaldehyde resole resin foams are prepared, one with microspheres and one without microspheres employing a conventional blowing agent. The following recipes are selected to provide foams of about equal density. Sample A contains microspheres; Sample B contains conventional blowing agent. The foaming compositions and materials employed are identical with Example 1 with the exception that in Sample B the expandable microspheres are replaced with trichlorotrifluoromethane; Sample A formulation is 300 grams of resole resin; 3.6 grams of alkyl silane block copolymer; 30 grams of vinylidene chloride/acrylonitrile microspheres and 12 cubic centimeters of catalyst. Sample B is 320 grams of resole resin; 3.84 grams of alkyl silane block copolymer; 10 cubic centimeters of trichlorotrifluoromethane and 12.9 cubic centimeters of catalyst. As the weight loss on curing of Sample B is substantially greater than Sample A, a larger quantity of resole resin is employed. After molding, the surface is removed from all faces of the rectangular foam samples. Each sample is post-cured in a circulating air oven at 70° C. for 128 hours. Sample A shows a loss of 9 percent of original weight; Sample B shows a loss of 19 percent original weight and the resultant density of both foams after hot air curing is 27 pounds per cubic foot. Sample A containing expandable microspheres has a flexural strength of 1025 pounds per square inch and a hardness at 10 percent ball penetration of 162 pounds; while the foam without microspheres has a flexural strength of only 720 pounds per square inch and a hardness at 10 percent ball penetration of 83 pounds. The microsphere-containing foam has completely closed cells of about 40 to 50 microns in diameter and is free of larger macro-voids. Sample B has 14.8 percent open cells with a substantial number of macro-voids. On sectioning of the two foams with a thin sharp blade, shavings from Sample A remain intact and resemble wood chips, whereas Sample B tends to fracture into brittle, dust-like fragments. Microscopic examination of the samples indicates that Sample A has spherical, rough-surfaced cells of from 40 to 50 microns in diameter apparently embedded in a rigid phenolic matrix. Sample B has large cells having many perforate walls and of rough irregular configuration.

EXAMPLE 4

The general procedure of Example 1 is repeated with the following formulation and replacement of the hydrochloric acid/glycol catalyst with a solution of 85 percent aqueous phosphoric acid: 300 grams resole resin; 3.6 grams alkyl silane block copolymer; 90 grams of expandable microspheres and 24 cubic centimeters of 85 weight percent phosphoric acid (15 percent water). The foamable mixture is then transferred to the mold which is pre-heated to 80° C. and cured in a circulating air oven at 80° C. for 2.5 hours. The resultant foam has a density of 35.3 pounds per cubic foot; the cells are spherical in shape and have a diameter of from about 40 to 50 microns. About 0.5 percent of the cells are open. Evaluation of the physical properties of the foam are as follows: compressive strength, 1450 pounds per square inch; compressive modulus, 38,800 pounds per square inch; flexural strength, 1440 pounds per square inch; flexural modulus, 80,500; the hardness at 10 percent ball penetration is 176 pounds.

EXAMPLE 5

The procedure of Example 4 is repeated with the exception that 30 grams of a wood sawdust are added. The sawdust passes through a 100 micron open screen. The resultant foam indicates 1 percent open cells; has a density of 37.1 pounds per cubic foot; a compressive strength of 1525 pounds per square inch; compressive modulus, 36,400 pounds per square inch; flexural strength, 1260 pounds per square inch; flexural modulus of 86,920 pounds per square inch, and a hardness at 10 percent ball penetration of 183 pounds and closed cells having diameters from about 40 to 50 microns.

EXAMPLE 6

Employing the general procedure of Example 1 and a cure temperature of 75° C., the following foam formulation is mixed in the order shown: 300 grams of phenol/formaldehyde resole resin; 3.6 grams of alkyl silane block copolymer; 90 grams of expandable microspheres; 14 milliliters of a 1:1 mixture of aqueous hydrochloric acid and ethylene glycol and 30 grams of chopped glass fibers having a length of ¼ inch. The foaming mixture is cured in a circulating air oven at 75° C. for one hour. The resultant foam has 3 percent open cells, the remainder being closed cells having diameters ranging from 40 to 50 microns; a density of 37.3 pounds per cubic foot; a compressive strength of 1760 pounds per square inch; compressive modulus, 39,800 pounds per square inch; flexural strength, 2010 pounds per square inch; flexural modulus, 125,700 pounds per square inch, and a hardness at 10 percent ball penetration of 177 pounds.

EXAMPLE 7

Employing the general procedure of Example 1, a foam is prepared employing the following formulation, the components being admixed in the order shown: 427.5 grams of phenol/formaldehyde resin; 22.5 grams of expandable microspheres; 5.12 grams alkyl silane block copolymer; 20 cubic centimeters of a 1:1 by volume mixture of aqueous concentrated hydrochloric acid and ethylene glycol. The mixture is placed in the mold which is pre-heated to 80° C. and cured at 80° C. in a circulating air oven for a period of 2 hours. The physical properties of the resultant foam are as follows: 4.2 percent open cells, the remainder being closed cells of about 40 to 50 microns in diameter; density, 40.6 pounds per cubic foot; compressive strength, 385 pounds per square inch; compressive modulus, 47,000 pounds per square inch; flexural strength, 1490 pounds per square inch; flexural modulus, 129,800 pounds per square inch; hardness at 10 percent ball penetration, 222 pounds.

EXAMPLE 8

The procedure of Example 7 is repeated with the exception that 20.25 grams of expandable microspheres are employed and 2.25 grams of expanded microspheres. The resultant foam has 3 percent open cells, the remainder being closed cells having diameters of from 40 to 50 microns; a density of 42.3 pounds per cubic foot; compressive strength, 350 pounds per square inch; compressive modulus, 47,800 pounds per square inch; flexural strength, 1660 pounds per square inch; flexural modulus, 138,200 pounds per square inch; hardness at 10 percent ball penetration, 308 pounds.

EXAMPLE 9

A foam core for a panel is prepared by admixing 150 grams of resole resin of Example 1 with 30 grams of the expandable saran microspheres of Example 1 and 7 cubic centimeters of a 1:1 by volume mixture of concentrated hydrochloric acid with ethylene glycol. The ingredients are mixed by a mechanical propeller-type stirrer for 30 seconds and placed in a mold; the enclosed mold is placed in an air oven at 80° C. for 2 hours to permit the foam composition to cure and harden. The density of the foam is 16.5 pounds per cubic foot with closed cells having diameters of from 40 to 50 microns. The foam is cut into a plurality of sections 1 inch in thickness. A commercially available uncured polyester impregnated glass mat weighing about ¾ ounce is placed on the surface of the phenolic foam and cured at room temperature employing a peroxide catalyst. The resultant foam composite has a density of 24 pounds per cubic foot.

EXAMPLE 10

A portion of the foam prepared in Example 9 is coated with a phenol/formaldehyde resole-impregnated glass mat applied to each of the major surfaces of the one inch thick specimen and cured at room temperature employing as a catalyst a 1:1 mixture of concentrated hydrochloric acid and ethylene glycol. The density of the foam composite is 28 pounds per cubic foot.

EXAMPLE 11

A carved wooden plaque is covered with a room temperature vulcanizing, commercially available silicone rubber. The rubber is allowed to cure under ambient conditions for 24 hours. The cured silicone rubber is stripped from the wooden plaque to provide a mold of the carved surface. A foam composition is prepared employing 60 parts by weight of the resole resin employed in Example 1; 0.72 part by weight of the previously employed silicone block copolymer; 6 parts by weight of the expandable microspheres employed in Example 1 and 2.8 parts by weight which is a mixture of 1 part concentrated hydrochloric acid and 1 part of ethylene glycol. The ingredients are mixed by hand in the sequence listed, and then for about 30 seconds with a high speed mechanical stirrer. The mixture is placed in the silicone rubber mold which has been pre-heated to 70° C. The open portion of the mold corresponding to the back of the plaque is covered with a sheet of polypropylene and weighted to form an enclosed mold. The mold and contents are held for one hour at 70° C., subsequently cooled and the silicone rubber stripped from the foam molding. The foam molding has fine uniform closed cells having diameters of from about 40 to 50 microns and a surface which shows good reproduction of the mold detail. The foam has a density of about 25 pounds per cubic foot. When the foregoing procedure is repeated, with the exception that the resin is heated to 50° C. before admixture with the remaining components of the formulation, the foam cures in from about 10 to 15 minutes.

EXAMPLE 12

An American white oak wooden door having an open grain pattern is sprayed with a commercially available silicone mold release agent and covered with room temperature vulcanizing silicone rubber formulation. The rubber formulation is cured at ambient temperature for about 48 hours and subsequently stripped from the door. The following formulation is mixed in the sequence shown employing a high speed mechanical mixer: 1800 grams of a commercially available resole resin having a viscosity of about 4000 centipoises and available under the trade designation Dynamit Nobel 6725; 21.6 grams of a silicone block copolymer commercially available under the trade designation of DC 193; 54 grams of expandable vinylidene chloride microspheres as employed in Examples 1 and 84 cubic centimeters of a catalyst solution consisting of equal volumes of concentrated hydrochloric acid and ethylene glycol. The silicone rubber mold is heated to 70° C. and the foam forming formulation quickly added. The mold is supported by a wooden box to prevent distortion. The molding is cured for one hour at 70° C. On cooling to room temperature the foam molding has a remarkably wood-like appearance and shows excellent reproduction of detail and detail of the wood grain. The density is about 38 pounds per cubic foot and the molding is dimensionally stable. After standing for 50 days at room temperature, the door shows a weight loss of 1.6 percent which is believed to be due entirely to the loss of water. No significant warping or distortion is observed. When the foregoing procedure is repeated, with the exception that the molding is immediately removed from the mold, weighed and placed in an air oven at 80° C. for periods of 24, 72 and 168 hours, the weight loss determined at those times and again after 50 days at room temperature, the data set forth in Table III which follows is obtained.

TABLE III

Density and weight loss of cabinet foam doors after aging at 80° C. and room temperature

| Sample number | Initial foam density [1] | Cure time in mold at 70° C., hr. | Post cure time at 80° C., hr. | Percent weight loss after— | |
|---|---|---|---|---|---|
| | | | | Post cure | 50 days [2] |
| 1 | 37 | 1 | | | 1.6 |
| 2 | 39 | 1 | 24 | 3.5 | 4.55 |
| 3 | 38 | 1 | 72 | 5 | 5.6 |
| 4 | 39 | 1 | 168 | 8.3 | 8.6 |

[1] Pounds per cubic foot.
[2] Total percent weight loss after 50 days includes the weight loss for post cure.

In each sample are closed cells having diameters ranging from about 40 to 50 microns. In no instance is dimensional change or warping observed. Similar beneficial results are obtained when expandable microspheres are employed having a polymer shell of 70 weight percent vinylidene chloride, 25 weight percent acrylonitrile and 5 weight percent methacrylonitrile. When the foregoing experiments are repeated employing finely divided filler, including ¼ inch long glass fibers, wood flour, polyester fibers, acrylonitrile fibers, finely ground carbon black, up to about 20 percent of the total weight of the formulation, similar results are obtained. When resole resins are employed having viscosities of 200 centipoises to 200,000 at 25° C. and 3 to 25 percent water, commensurate results are obtained. When other expandable microspheres meeting the hereinbefore delineated requirements are used, commensurate results are also obtained.

EXAMPLE 13

A phenol/formaldehyde resin foam is prepared employing Components (A), (B) and (C) of Example 1 plus blown clay microspheres which have a particle size of about 300 microns and a bulk density of about 45 pounds per cubic foot. The clay microspheres are primarily monocellular. A foamable hardenable composition is prepared by rapidly admixing 240 parts by weight of the hereinbefore described phenol/formaldehyde resin; 9.6 parts by weight perchloroethylene; 2.88 parts by weight of the silicone glycol surfactant commercially available under the trade designation of DC 193; 30 parts by weight of the hereinbefore described expandable synthetic resinous microspheres and 11.2 parts by weight of the hydrochloric glycol catalyst. The mixture is stirred by hand on addition of the catalyst as the last component and is stirred for 30 seconds with a high speed mechanical agitator. The mixture is placed in a pre-heated poly-propylene-lined closed metal mold which is maintained in a circulating hot air oven at 80° C. for a period of 2 hours. The mold is removed from the oven and the cured molding removed from the mold. A section is removed from the molding and examined under a light microscope. The clay microspheres are evenly distributed and firmly adhered to the phenolic matrix. The resultant foam has a density of 31.4 pounds per cubic foot; a compressive strength of 815 pounds per square inch and a flexural strength of 1000 pounds per square inch. The foam consists of closed cells having diameters of about 40 to 50 microns from the expandable microspheres and 300 micron cells corresponding to the clay microspheres and is not brittle or friable, has a hard surface and is resistant to impact and penetration by sharp objects.

EXAMPLE 14

Employing the procedure of Example 1, a plurality of samples are prepared employing the formulation set forth in Table IV which follows.

TABLE IV

| Sample number | Resole [1] | Trichloro-trifluoro-methane, ccs. | Expandable microspheres [1] | DC 193 [1] | Catalyst, ccs.* | Kaolin clay [1] |
|---|---|---|---|---|---|---|
| 1** | 120 | | 36 | 1.44 | 5.6 | 40 |
| 2** | 120 | | 36 | 1.44 | 5.6 | 40 |
| 3 | 120 | 6 | | 1.44 | 5.6 | 40 |

[1] Grams.
*Volume ratio of l./l. concentration HCl/ethylene glycol.
**Samples 1 and 2 are duplicates made to show reproducibility.

The physical properties of the foams made from the formulations in Table IV are listed in Table V which follows.

TABLE V

| Sample number | Density [1] | Flexural | | Percent open cells | 10% ball penetration, lbs. |
|---|---|---|---|---|---|
| | | Strength [2] | Modulus [2] | | |
| 1 | 14.9 | 278 | 17,258 | 17 | 26.3 |
| 2 | 15.4 | 267 | 15,280 | 11 | 32.5 |
| 3 | 13.04 | 95 | 4,900 | 65 | 7.2 |

[1] Pounds per cubic foot.
[2] Pounds per square inch.

Examination of Samples 3 and 2 with a scanning electron microscope indicates that Sample 3 has a relatively large size which is friable, while Sample 2 appears to have small, uniform, spherical cells of about 40 to 50 microns having clay particles uniformly distributed throughout the cured phenolic matrix.

EXAMPLE 15

The general procedure of Example 1 is repeated employing 120 parts by weight of resole resin; 1.44 parts by weight of the silicone glycol surfactant; 36 parts by weight of the expandable vinylidene chloride microspheres; 5.6 cubic centimeters of 1:1 hydrochloric acid/ethylene glycol catalyst and 60 parts by weight of ceramic foam cubes measuring about ½ inch per edge and having a density of about 12 pounds per cubic foot. The ceramic cubes are preheated to about 75° C. and the remaining ingredients mixed by hand stirring and the ceramic cubes added as the last ingredient. The resultant mixture is placed in a polypropylene-lined metal mold which is preheated to 75° C. and the mold heated in a circulating air oven at 75° C. for a period of one hour. The resultant foam composite is of excellent quality, non-friable, with good adhesion between the ceramic cubes and the foam. The foam composite has a density of 17.7 pounds per cubic foot; a compressive strength of 263 pounds per square inch and a compressive modulus of 10,730 pounds per square inch. For purposes of comparison, a similar mixture is prepared wherein the saran microspheres are omitted and trichlorotrifluoroethane commercially available under the trade designation of Freon-113 substituted. The resultant foam is very friable and shows a poor bond to the ceramic cubes.

EXAMPLE 16

Employing the resole resin catalyst and expandable microspheres of Example 1, foams are prepared employing microspheres and conventional resole foam formulation, each sample using a like clay. The formulations are shown in Table VI which follows.

TABLE VI

| Sample number | Resole[1] | Trichloro-trifluoro-ethane, ccs. | Expand-able micro-spheres[1] | DC 193[1] | Catalyst, ccs.* | Foam clay micro-spheres[1] |
|---|---|---|---|---|---|---|
| 1 | 120 | | 36 | 1.44 | 5.6 | 40 |
| 2 | 120 | 6 | | 1.44 | 5.6 | 40 |

[1] Grams.
* Volume ratio of 1./1. concentrate HCl/ethylene glycol.

The ingredients in each of the samples in the preceding table are mixed by hand stirring, cured in a preheated polypropylene-lined metal mold at 75° C. in a circulating air oven for a period of 2 hours. Physical properties of the foams are determined after curing and are set forth in Table VII. Sample 1 has fine cells having diameters from about 40 to 50 microns. Sample 2 exhibits poor bonding of the clay to the resin matrix and has cells of about 1 to 2 millimeters.

EXAMPLE 17

A plurality of resole foam formulations are prepared generally as set forth in Example 1 employing the same resole resin, expandable microspheres, catalyst and surface active agent with varying types and varities of clay. The formulations are set forth in Table VIII which follows.

TABLE VIII

| Sample number | Resole[1] | Expand-able micro-spheres[1] | DC 193[1] | Catalyst, ccs.* | Clay[1] ** |
|---|---|---|---|---|---|
| 1 | 120 | 36 | 1.44 | 5.6 | 40/GLC aggregate; 1,000 microns. |
| 2 | 120 | 36 | 1.44 | 8 | 40/clay pellets; 500 to 1,000 microns. |
| 3 | 120 | 36 | 1.44 | 5.6 | 70/clay foam microspheres; 300 microns. |
| 4 | 120 | 36 | 1.44 | 5.6 | 70/clay beads; 500 microns. |
| 5 | 120 | 36 | 1.44 | 5.6 | 120/clay foam microspheres; 300 microns. |
| 6 | 90 | 24 | 1.08 | 4.2 | 90/clay foam microspheres; 300 microns. |

[1] Grams.
*Volume ratio of 1/1 concentrate HCl/ethylene glycol.
**Milford Silt clay in form indicated.

The ingredients for each of the samples in Table VIII are mixed by hand and cured in a metal mold at 70° C. in a circulating air oven for a period of 2 hours. After curing, the foams are cooled to room temperature and physical properties determined. Each sample shows some closed cells corresponding to the expandable microspheres having diameters of from about 40 to 50 microns. The results are set forth in Table IX which follows.

TABLE IX

| Sample number | Density[1] | Compressive Strength[2] | Compressive modulus[2] | Flexural Strength[2] | Flexural Modulus[2] | Percent open cells | 10% ball penetration, lbs. |
|---|---|---|---|---|---|---|---|
| 1 | 15.15 | 305 | 13,000 | 272 | 19,700 | 0 | 36.2 |
| 2 | 16.5 | 290 | 19,000 | 298 | 15,670 | 0 | 34.0 |
| 3 | 16.3 | 250 | 9,300 | 260 | 14,500 | 2.9 | 26.5 |
| 4 | 18.5 | 265 | 10,070 | 380 | 22,750 | 0.7 | 36.3 |
| 5 | 21.5 | 310 | 14,000 | 225 | 16,600 | 19.5 | 36.5 |
| 6 | 17.8 | 197 | 7,540 | 195 | 11,700 | 15.1 | 24.8 |

[1] Pounds per cubic foot.
[2] Pounds per square inch.

Example 18

A plurality of foam samples are prepared and evaluated for high temperature insulation employing the formulations set forth in Table X which follows.

TABLE X

| Sample number | Resole[1]* | Expand-able micro-spheres[1] | DC 193[1] | Catalyst, ccs.** | Kaolin[1] | Foam clay micro-spheres[1]*** |
|---|---|---|---|---|---|---|
| 1 | 1,728 | 518 | 20.8 | 80.6 | | 288 |
| 2 | 1,728 | 518 | 20.8 | 80.6 | | 576 |
| 3 | 1,728 | 518 | 20.8 | 80.6 | 216 | |
| 4 | 1,728 | 518 | 20.8 | 80.6 | 432 | |
| 5 | 1,728 | 259 | 20.8 | 80.6 | | 288 |
| 6 | 1,728 | 259 | 20.8 | 80.6 | | 576 |

[1] Grams.
*The resole resin had a viscosity of 2,800 centipoise.
**Volume ratio of 1./1. concentrate HCl/ethylene glycol.
***300 micron particles.

The samples are prepared by mixing in a mechanical kneading-type mixer and cured in a polypropylene-lined wooden mold having a cavity 12 inches by 12 inches by 4 inches in depth. The molds are cured in an air oven for a period of one hour and the foam samples removed and evaluated for physical properties. Each sample shows

TABLE VII

| Sample number | Density[1] | Compressive Strength[2] | Compressive Modulus[2] | Percent open cells | 10% ball penetration, lbs. |
|---|---|---|---|---|---|
| 1 | 15.45 | 275 | 11,000 | 6.2 | 25.1 |
| 2 | 15.85 | 150 | 6,500 | 53.7 | 16.9 |

[1] Pounds per cubic foot.
[2] Pounds per square inch.

closed cells corresponding to the expandable microspheres having a size of from 40 to 50 microns. The results are set forth in Table XI which follows.

TABLE XI

| Sample number | Density a | Flexural strength b | 10% ball penetration, lbs. | Percent Open cells | Percent Weight time 1 | Burning time 2 | K factor 3 |
|---|---|---|---|---|---|---|---|
| 1 | 12.8 | 273 | 42.1 | 0 | 0.4 | >720 | 0.245 |
| 2 | 11.5 | 226 | 36.0 | 0 | 0.59 | 720 | 0.252 |
| 3 | 12.3 | 260 | 29.0 | 0 | 0.4 | 720 | 0.28 |
| 4 | 11.8 | 280 | 30.5 | 0 | 0.38 | 720 | 0.295 |
| 5 | 12.7 | 335 | 53.1 | 0 | 1.1 | 720 | 0.268 |
| 6 | 13.4 | 307 | 35.4 | 2.6 | 1.2 | 720 | 0.330 | a Pounds per cubic foot.
b Pounds per square inch.
1 Percent weight loss—the percent weight loss is determined in accordance with ASTM Tumbling Test 421–61 wherein 12 one inch cubes of a mterial to be evaluated, along with twenty-four ¾″ oak cubes are placed in a closed box and rorated at 60 revolutions per minute for 60 minutes. The specimens are weighed before and after tubling.
2 Burning time in seconds—determined in accordance with the procedure set forth in U.S. Bureau of Mines Penetration Test, Document 6366 wherein 6 x 6 6 x 1″ foam samples are exposed to a flame having a temperature of 1,935° F. ±25° at a point 2″ from the burner nozzle and the face of the foam sample 1″ from the nozzle. The burning time is the period of time less than 12 minutes required for ignition of a piece of paper on the side of the foam remote from the flame.
3 K factor—value thermal conductivity expressed in B.t.u./in./sq. ft./hr./° F.

For purposes of comparison, two samples of conventional phenolic foam containing clay are prepared in a generally similar manner with the exception that in both instances 86.4 cubic centimeters of Freon-113 are substituted for the 518 grams of expandable microspheres. Otherwise the formulation is identical to Samples 1 and 2. Due to the presence of the volatile fluorocarbon blowing agent, the samples are cured in a preheated mold at 50° C. for one hour. The sample contains 288 grams of foamed clay microspheres and a burning time of 343 seconds. The sample with 576 grams of foamed clay microspheres has a burning time of 520 seconds. The weight percent loss is in excess of 10 fold of that of Samples 1–6 and the foam is 100 percent open cell foam having a cell size of 1 to 2 millimeters.

Example 19

A composite phenolic resole foam is prepared employing the following formulation: 120 parts by weight of resole having a viscosity of about 10,000 centipoise; 1.44 parts by weight of the alkyl silicone block copolymer; 12 parts by weight of the expandable microspheres of Example 1; 12 parts by weight of kaolin clay and 9.6 parts by weight of phosphoric acid. The ingredients are mixed in the foregoing sequence by hand stirring and the mixture is placed in a heated mold at 80° C. The mold is placed in an oven at 80° C. for a period of 3 hours. The resultant foam is light colored, has closed cells corresponding to the expandable microspheres having cell sizes of from 40 to 50 microns, has a density of about 10 pounds per cubic foot and on exposure to flame is non-burning.

Example 20

A resole resin foam is prepared employing the following components: 1728 grams of resole resin; 20.8 cubic centimeters of alkyl silicone block copolymer surfactant; 175 cubic centimeters Freon-113; 120 cubic centimeters of a 1:1 mixture of hydrochloric acid and ethylene glycol as catalyst; the foam mixture is placed in a metal mold and cured at 75° C. for 2 hours. A portion of the foam 10″ x 10″ x 1″ in thickness is cut from the molding. The foam sample has a density of about 2 pounds per cubic foot and a cell size of 1 to 2 millimeters. A second resole foam is prepared employing 150 grams of resole resin, 22 grams of the expandable vinylidene chloride microspheres of Example 1; 6 cubic centimeters of a catalyst consisting of equal parts of concentrated hydrochloric acid and ethylene glycol, and 56 grams of kaolin clay. The mixture is poured into a 9 x 9 x ⁵⁄₁₆ inch deep metal frame positioned on the surface of the 10 x 10 x 1 inch foam and cured at 80° C. for about one hour to provide a foam having a cell size of from about 40 to 50 microns. The composite is subjected to the foam test of Example 6. The clay-containing foam does not burn through after 12 minutes exposure.

EXAMPLE 21

A resole foam forming composition is prepared using the following ingredients: 120 grams of the hereinbefore described resole resin; 1.44 grams of alkyl silane block copolymer surfactant; 36 grams of the expandable vinylidene chloride microspheres of Example 1; 5.6 cubic centimeters of a 1:1 mixture of hydrochloric acid using ethylene glycol as a catalyst and 20 grams of blown vermiculite. The vermiculite is ground and broken into pieces with a particle size less than ⅛ inch by ¼ inch by ¼ inch. The particles are heated in an air oven at 80° C. for 30 minutes. The ingredients of the foam, with the exception of the vermiculite, are admixed in the order given. The vermiculite particles are added and mixed as the last ingredient and then the foamable mixture is placed in a mold which is preheated to 80° C. The mold is then placed in a circulating air oven at 80° C. for two hours. On removal of the foam from the mold a non-friable foam is obtained having cells corresponding to the expandable microspheres and having diameters from 40 to 50 microns, with good adhesion between the foam and the vermiculite. The composite of foam and vermiculite has a density of 14.8 pounds per cubic foot; a compressive strength of 190 pounds per square inch; a compression modulus of 11,600 pounds per square inch. The composite passes the U.S. Bureau of Mines Fire Test. When the foregoing procedure is repeated with the exception that the microspheres are omitted and a similar quantity of Freon-113 is employed, the product is friable and has a poor bond between the vermiculite polymer and the particles.

EXAMPLE 22

The procedure of Example 21 is repeated with the exception that the blown vermiculite is replaced with 30 grams of expandable vermiculite. The product is usually determined to be of excellent quality, non-friable and exhibits a good bond between the expandable vermiculite particles and the foam. The foam composite has a density of 15.3 pounds per cubic foot; a compressive strength of 268 pounds per square inch and a compressive modulus of 9330 pounds per square inch. The foam passes the U.S. Bureau of Mines Fire Test. The vermiculite particles expand with heat and appear to form a heat shield on the foam surface. A foamable formulation is prepared with the following ingredients: 120 grams of resole resin; 36 grams of vinylidene chloride microspheres of Example 1; 5.6 grams of a 1:1 mixture of hydrochloric acid and ethylene glycol; 40 grams of clay microspheres; 10 grams of chopped glass fiber. The ingredients are combined in the order listed and cured in the manner set forth in Example 21. The foam composite is of excellent quality, non-friable and shows a good bond between the glass fibers, clay, expanded microspheres and foam. The foam composite has a density of 17.6 pounds per square inch;

about 100 percent closed cells (40 to 50 microns in diameter); a compressive strength of 345 pounds per square inch; a compressive modulus of 13,000 pounds per square inch and passes the U.S. Bureau of Mines Fire Test.

EXAMPLE 23

Three foamable compositions are prepared; the formulations are set forth in Table XII. Each of the formulations are placed in a mold which is preheated to 75° C. and cured in an air oven at 75° C. for one hour. Each of the molds is 36 inches long and of a semi-cylindrical hollow configuration to provide a 2 inch thick covering for pipe having nominal 4 inch diameter. The moldings vary in density from about 15 to 20 pounds per cubic foot, exhibit a high quality surface skin and are eminently satisfactory for installation of high temperature steam lines and small reactors.

TABLE XII.—FORMULATION

| Sample number | Resole [1] | Expandable microspheres [1] | DC 193 [1] | Catalyst, ccs. | Kaolin [1] | Foam clay microspheres [1] |
|---|---|---|---|---|---|---|
| 1 | 2,710 | 704 | 33 | 88 | | 655 |
| 2 | 2,800 | 824 | 34 | 90 | 374 | |
| 3 | 2,400 | 738 | 30 | 115 | | 615 |

[1] Grams.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. A method for the preparation of thermoset synthetic resinous resole foam compositions, the steps of the method comprising
    providing in intimate admixture (a) a resole resin having a viscosity of from 300 to 100,000 centipoises at 25° C. when the water content of the resin is 15 percent by weight, (b) a catalyst for the resole resin, the catalyst comprising a strong inorganic or organic acid, (c) a plurality of synthetic resinous thermoplastic expandable microspheres, the microspheres comprising a synthetic resinous thermoplastic shell of a polymer containing at least 50 percent by weight vinylidene chloride and at least one ethylenically unsaturated monomer copolymerizable therewith, having encapsulated therein a volatile liquid foaming agent,
    confining the mixture within a mold of desired configuration, and
    curing the mixture until the mixture has hardened to a self-supporting mass containing a plurality of closed, gas-filled cells having diameters from 10 to 100 microns.
2. The method of Claim 1 wherein the resole resin has a viscosity of between about 200 and 200,000 centipoises at 25° C.
3. The method of Claim 1 wherein the expandable resinous microspheres are employed in a proportion of from about 1 weight percent to about 50 weight percent of the combined weight of the resole resin and microspheres.
4. The method of Claim 1 wherein the hardened resole resin has a density of from about 10 to 50 pounds per cubic foot.
5. The method of Claim 1 wherein the hardened resole resin has a density of from about 10 to 20 pounds per cubic foot.
6. The method of Claim 1 wherein the hardened resole resin has a density of from about 20 to 50 pounds per cubic foot.
7. The method of Claim 6 including the step of adding reinforcing filaments.
8. The method of Claim 6 including the step of adding an inorganic finely divided filler in a proportion of from about 5 parts to 50 parts per hundred parts of the resole resin.
9. The method of Claim 1 wherein the expandable microspheres are present in a proportion of from about 3 to 10 weight percent, based on the weight of the resole resin.
10. The method of Claim 1 wherein from about 5 to 50 parts by weight of finely divided inorganic filler is employed per 100 parts by weight of resole resin.
11. The method of Claim 10 wherein the particulate filler is employed in a proportion of from about 10 to 30 parts by weight.
12. An improved resole foam, the resole foam comprising a body of a continuous cured resole resin containing a plurality of expanded thermoplastic synthetic resinous gas-filled microspheres having a polymer shell containing at least 50 weight percent vinylidene chloride, the resole foam having a density of from about 10 to 50 pounds per cubic foot.
13. The foam of Claim 12 having a density of from about 20 to 50 pounds per cubic foot.
14. The foam of Claim 12 having a density of from about 10 to 20 pounds per cubic foot.
15. The foam of Claim 14 wherein a finely divided particulate inorganic filler is generally uniformly dispersed throughout the foam.
16. The foam of Claim 15 wherein the inorganic filler is foamed clay microspheres.
17. The foam of Claim 12 containing from about 3 to 10 weight percent expanded thermoplastic microspheres, based on the weight of the cured resole resin.
18. The foam of Claim 15 wherein the particulate inorganic filler is present in a proportion of from about 5 to 50 parts by weight per 100 parts by weight of resole resin.
19. The foam of Claim 18 wherein the particulate filler is present in a proportion of from about 10 to 50 parts by weight per 100 parts by weight of the resole resin.
20. The foam of Claim 12 having an integral smooth molded surface.

References Cited

UNITED STATES PATENTS 3,615,972  10/1971  Morehouse, Jr. et al.
                                                260—2.5 B
2,806,509   9/1957  Bozzacco et al. ----- 260—2.5 B
2,958,905  11/1960  Newberg et al. ------- 260—2.5

MORTON FOELAK, Primary Examiner

U.S. Cl. X.R.

260—2.5 F, 17.2 R, 29.3, 38, 826, 844, 847; 264—41, 45, 225, Dig. 6